United States Patent [19]
Greanias

[11] 3,977,483
[45] Aug. 31, 1976

[54] MATERIAL HANDLING APPARATUS AND METHOD

[75] Inventor: James G. Greanias, Louisville, Ky.

[73] Assignee: The Kingsford Company, Louisville, Ky.

[22] Filed: Apr. 2, 1975

[21] Appl. No.: 564,271

[52] U.S. Cl. .................................. 177/1; 177/25; 177/123; 53/59 R; 53/59 W
[51] Int. Cl.² ................ G01G 19/04; G01G 13/02; B65B 57/00
[58] Field of Search ............... 177/1, 25, 122, 123, 177/45; 53/59 R, 59 W; 221/206, 207

[56] References Cited
UNITED STATES PATENTS

| | | | |
|---|---|---|---|
| 2,632,588 | 3/1953 | Hoar, Jr. ............................. | 53/59 R |
| 2,802,658 | 8/1957 | Hensgen et al. ..................... | 177/1 |
| 3,073,399 | 1/1963 | Durand ............................... | 177/122 X |
| 3,311,182 | 3/1967 | Rusnack et al. ...................... | 177/45 |
| 3,416,619 | 12/1968 | McClusky ............................ | 177/123 |
| 3,416,620 | 12/1968 | McClusky ............................ | 177/123 |
| 3,620,317 | 11/1971 | Henry ................................ | 177/123 X |
| 3,708,025 | 1/1973 | Soler et al. ......................... | 177/122 X |

Primary Examiner—George H. Miller, Jr.
Attorney, Agent, or Firm—Wegner, Stellman, McCord, Wiles & Wood

[57] ABSTRACT

An apparatus and method for the determination and the standardization of package weight in a package filling line. The apparatus and method incorporates a standard filling means to initially underfill packages, a means to thereafter weigh the packages, a means to determine and dispense the additional product needed to correctly fill the package, and a means to transfer that product to the package prior to the sealing of the package.

15 Claims, 1 Drawing Figure

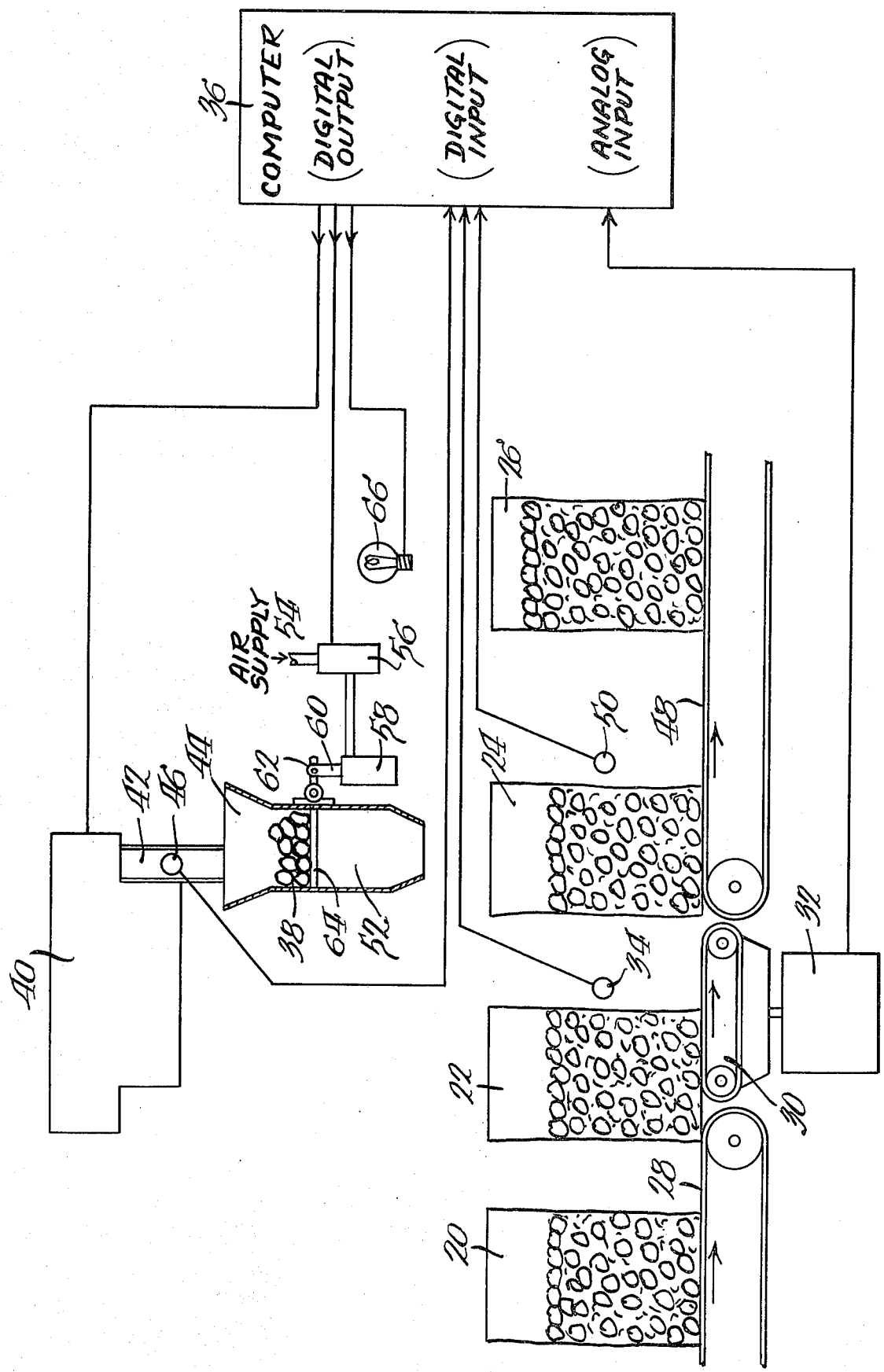

MATERIAL HANDLING APPARATUS AND METHOD

BACKGROUND OF THE INVENTION

1. Field of the Invention

This invention relates generally to package filling systems and, particularly, to an automated package filling apparatus and method that standardizes package weights.

2. Description of the Prior Art

It is presently a practice in the packaging industry to have a package filling apparatus and method having a line comprised of a package filling machine, a conveyor belt, a package sealing device and a check weigher with a reject mechanism at the termination of the line. Such a line does, however, have some inherent defects. In a large volume filling system, a continual problem appears to be the attainment of correct package weight. Since the initial package filling machine often does not fill packages uniformly and since the packages are sealed prior to a weight check, many packages must be rejected, opened and refilled. The initial filling is inaccurate because it is often based on weight but the variation is great enough to be constantly giving away product or shorting bags causing rework. This being the case, bulky, noncompact products, such as charcoal, which neither uniformly nor consistently occupy identical volumes with identical weights, do not lend themselves to usual packaging methods and still obtain any degree of uniformity. The aforementioned rejection process is an inefficient and wasteful means of obtaining or controlling standard weights.

SUMMARY OF THE INVENTION

It is, therefore, a primary object of the present invention to modify an existing package filling line system so that packages are produced with more accurate and uniform weight content.

It is also an object of the present invention to provide a package filling apparatus and method which examines package weight and corrects the weight prior to the sealing of the packages.

It is another object of the present invention to automate this system by incorporating a digital computer with analog conversion capabilities to analyze and control the package filling line.

It is a further object of the present invention to provide a package check weighing system that does not require adjustment of the weighing means when production is changed, but only requires new computer input.

It is still another object of the present invention to incorporate a weight check system into an existing line which will not cause a reduction in production speed, but rather will increase it.

It is yet another object of the present invention to provide a system which may either be introduced into a line which fills, closes and seals packages, or into a line which fills but does not close or seal packages.

BRIEF DESCRIPTION OF THE DRAWINGS

Further features and advantages of the present invention will readily be apparent from the following specification and from the drawing, wherein:

The FIGURE schematically illustrates the package filling line incorporating the weight checking and correcting system of the present invention.

DESCRIPTION OF THE PREFERRED EMBODIMENT

The invention described herein may be incorporated into an existing package filling line, which line consists of a conventional package filling mechanism located to the left of the line in the drawing and is not shown. The existing line also includes a package closing device which is, likewise, not shown and which is located to the right of the line in the drawing. The closing device may be a sewing machine. In light of the present invention, the apparatus and method is modified in the following manner.

The standard package filling mechanism (not shown) is set to slightly underfill the packages 20, 22, 24, 26 and the like. The packages are deliberately underfilled since it is easier to correct weight by adding product than by deleting product. Further, the latter method would tend to create waste of valuable product if not removed from the overfilled package. The packages 20, 22, 24, 26 are moved from the filling machine on a conveyor 28 to a conveyor 30 which is the weighing table of an electronic weighing scale 32. The electric eye 34 consisting of a photocell and an appropriate light source is mounted beside conveyor 30 and is interrupted when a package to be weighed is properly positioned on said conveyor 30 as is package 22. When the package is positioned on scale 32, the electric eye is tripped, the package is weighed and the information is signaled to the analog-to-digital converter in the computer 36. The computer 36 then compares the package weight with some predetermined standard weight stored within the computer's memory. If the package is underweight, the computer 36 calculates the amount and number of additional product 38 of average weight that is needed to bring the package up to the standard weight.

Mounted on a frame above the conveyor line is a vibratory bowl feeder 40 in which is constantly fed a source of average weight product 38 (not shown). The vibratory feeder is constantly vibrating when activated and discharges one product 38 at a time. The product 38 falls from the discharge point of the vibratory feeder 40 into accumulating hopper 44. Electric eye 46 is interrupted as each product 38 falls from the feeder 40 to the hopper 44.

When the amount and number of additional product 38 has been determined, the computer 36 activates the vibrating bowl feeder 40 which emits product 38 therefrom one at a time, and which product then falls into the accumulating hopper 44. Situated adjacent the path 42 is an electric eye 46, comprised of a photocell and a light source, which, when interrupted by each passing product 38, signals computer 36 thus enabling the amount and number of product entering the hopper 44 to be tabulated by the computer 36. When the computer 36 concludes that the amount and number of product 38 transferred to the hopper 44 equals the amount that was previously determined to have been required to bring the package 22 up to its proper weight, the computer 36 signals the feeder 40 to terminate feeding of product to the hopper 44.

While the hopper 44 is being loaded, the package continues along the line moving from scale conveyor 30 to conveyor 48 and reaches a position which is the same as that of package 24. An electric eye 50, comprised of a photocell and a light source, is mounted beside conveyor 48 in alignment with the downstream side of the discharge funnel 52 of the hopper 44. The electric eye 50 is interrupted as the package passes the eye signaling the computer 36 that the package is in position to be filled. An air supply 54 is connected to an electro pneumatic valve 56 and through the valve to an actuating cylinder 58. The piston 60 of the cylinder 58 is connected to a link 62 which is connected to the hopper release door 64.

When the computer 36 determines that a package is in filling position and that the correct amount and number of product 38 is in the hopper 44, it emits a signal to the electrical pneumatic valve switch 56 to activate and provide air into the cylinder 58 causing the piston 60 to reciprocate and thereby open the hopper release door 64 at the funnel 52 of the hopper 44. The product accumulated therein drops through the door 64 into the package positioned directly underneath the funnel of the hopper 44 and hence, the package is then brought up to the desired filling weight. Thereafter, the correctly filled package continues along the conveyor 48 to the package sealing or stitching device (not shown).

The system herein also has a device to signal when a package is too far underweight to be properly filled or is overweight beyond normal limits. If the computer 36 receives such information from the electronic weighing scale 32, it will activate a warning device, such as red light 66. The errant package is then either manually removed from the line or a kick out device is provided to automatically remove the package from the line. The kick out device may only turn the package or, in some other way, move it out of the line so as not to be closed at the closing station.

The computer 36, wired into the packaging filling line system, is a sensor based computer with the electronic weighing scale 32 connected to its analog input feature, with the electric eyes 34, 46 and 50 connected to its digital input feature, and with the vibrating bowl feeder 40, the electrical pneumatic switch 56 and warning device 66 connected to its output features. The computer also has integral therewith an operator's terminal so that the operator can communicate product names, target weights and the like to the computer and receive, in return, production reports.

At the start of production, a standard weight is placed on the scale 32 and the computer records that weight as its fixed standard with which to compare any packages moving along the line thereafter. Hence, the need to manually adjust the scale for each product or package weight is negated.

The apparatus and method has improved the accuracy of filling operations, can be integrated into present lines without major redesign of the old line and, in most circumstances, permits an increase in the number of packages filled per hour.

Although the present apparatus and method has been designed for use in the charcoal industry for filling and closing bags or packages of charcoal briquettes, it is usable in any package filling field wherein articles of substantially uniform size and/or weight are being packaged in predetermined sizes or weights of packages.

I claim:

1. An apparatus for filling packages with product up to a predetermined weight comprising:
    means for underfilling a package with product;
    means for measuring the weight of such an underfilled package;
    means for computing the amount of additional product required to bring the underfilled package up to its predetermined weight;
    a source of additional product;
    means for dispensing additional product from said source and delivering the additional product to the underfilled package along a path extending generally between said source and the underfilled package;
    means for determining the amount of additional product dispensed passing along said path; and
    means for comparing the amount of additional product dispensed with the computed amount and terminating the dispensing of additional product when the amount of additional product dispensed is equal to the computed amount so that the underfilled package is brought up to its predetermined weight.

2. The apparatus of claim 1 wherein said means for computing additional product is a computer connected to said means for measuring weight which computer compares the weight of said package with a standard weight retained therein.

3. The apparatus of claim 1 wherein a means is provided to visually warn of an improperly filled package.

4. The apparatus of claim 1 wherein said means for measuring weight is an electronic weighing scale.

5. The apparatus of claim 4 wherein the package is weighed by said scale after an electric eye signals a computer that said package is properly positioned thereon.

6. The apparatus of claim 1 wherein said means for dispensing comprises a feeder to dispense additional product from said source, a hopper to accumulate the additional product dispensed by said feeder, a portion of said path extending between said feeder and said hopper and along which the amount of additional product dispensed is tabulated by said determining means, said hopper accumulating additional product until the additional product accumulated is equal to the computed amount and thereafter transferring that additional product to the underfilled package.

7. The apparatus of claim 6 wherein said means for determining the amount of additional product dispensed is comprised of an electric eye disposed along said path which signals a computer when product passes therethrough.

8. The apparatus of claim 6 wherein additional product is transferred from said hopper to the underfilled package after an electric eye signals a computer that the underfilled package is properly positioned therewith to receive the additional product accumulated in said hopper.

9. An apparatus for filling packages to a predetermined weight in a production line comprising a means for underfilling a package with a product, means for determining the weight of said package, means for determining the additional product required to fill the said package to its predetermined weight, a feeder for dispensing additional product, an electric eye which signals a computer when product passes therethrough for tabulating the additional product emitted from said feeder, and a hopper to accumulate said additional product and dispense it to said package.

10. An apparatus for filling packages to a predetermined weight in a production line comprising a means for underfilling a package with a product, means for determining the weight of said package, means for determining the additional product required to fill said package to the predetermined weight, a feeder for dispensing additional product, a means for tabulating the additional product emitted from said feeder, and a hopper to accumulate said additional product, the product being dispensed from said hopper after an electric eye signals a computer that said package is properly positioned thereunder.

11. A method for filling an open top bag with a multiplicity of substantially similar particles comprising the steps of initially partially filling the upright open top bag with less particles than are known to be needed to fill said bag, weighing said bag to determine the number of particles needed to fill the bag, dispensing particles one at a time from a feeder source into a collection chamber, counting the dispensed particles as they move from said feeder source, shutting off further dispensing of particles after the required number has been dispensed to the collection chamber, aligning said bag with said collection chamber to transmit a signal to open said collection chamber and to discharge the required number of particles into said bag.

12. A method for filling a package with a multiplicity of discrete average weighed particles comprising the steps of initially partially filling an upright package with less particles than are known to be needed to fill said package, weighing said partially filled package to determine the amount of weight needed to fill the package, computing in a computer the number of average weighed particles required to bring the package weight up to the full predetermined weight, dispensing average weighed particles one at a time from a feeder source into a collection chamber in response to a signal from said computer, counting the dispensed weighed particles as they move from said feeder source, shutting off further dispensing of weighed particles after the computed required number has been dispensed to the collection chamber, moving said package from the weighing station toward a position in alignment with said collection chamber, aligning said package with said collection chamber to transmit a signal to open said collection chamber and to discharge the computed required number of weighed particles into said package and moving said filled package through a package closing station.

13. In a package filling device, a sensor based computer having an analog input means and a digital input means, a weighing scale connected to said analog input means, electric eye means aligned with a station over said scale and connected to said digital input means, a conveyor aligned with said scale for receiving a package from said scale, a second electric eye aligned with a second station over said conveyor and connected to said digital input means, a vibratory feeder having an outlet aligned with a hopper having a discharge gate, a third electric eye aligned with the path between the feeder outlet and the hopper and connected to said digital input means, means connected to a digital output of said computer for individually actuating said vibratory feeder, said output gate on said hopper and a warning light whereby the weight of a package on the scale is compared in the analog input means with a standard and if found underweight the digital output actuates the feeder to feed the requisite weight into the hopper and which hopper is unloaded into the package when the third electric eye signals alignment of the package with the hopper.

14. An apparatus for filling packages with product up to predetermined weight comprising:
means for underfilling a package with product;
means for measuring the weight of such an underfilled package;
means for computing the amount of additional product required to bring the underfilled package up to its predetermined weight;
a source of additional product;
means for dispensing additional product from said source;
a hopper for accumulating the additional product dispensed from said source;
means for determining the amount of additional product being accumulated within said hopper; and
means for comparing the amount of additional product dispensed with the computed amount and terminating the dispensing of additional product when the amount of additional product accumulated in said hopper is equal to the computed amount, the additional product accumulated in said hopper thereafter being transferred to the underfilled package to bring it up to its predetermined weight.

15. A method for filling a package with a multiplicity of substantially similar particles comprising the steps of:
initially partially filling the package with less particles than are known to be needed to properly fill said package;
weighing said package to determine the number of additional particles needed to properly fill said package;
dispensing particles one at a time from a feeder source;
counting the dispensed particles as they move from said feeder source;
shutting off further dispensing of particles after the needed number have been dispensed from said feeder source; and
discharging the needed number of particles to said package in order to properly fill said package with product.

* * * * *